US012146550B2

(12) United States Patent
Kanade

(10) Patent No.: US 12,146,550 B2
(45) Date of Patent: Nov. 19, 2024

(54) INTERPOLATING GEAR TRAINS AND GEAR NETWORKS

(71) Applicant: Udayan Kanade, Pune (IN)

(72) Inventor: Udayan Kanade, Pune (IN)

( * ) Notice: Subject to any disclaimer, the term of this patent is extended or adjusted under 35 U.S.C. 154(b) by 556 days.

(21) Appl. No.: 17/293,091

(22) PCT Filed: Nov. 15, 2019

(86) PCT No.: PCT/IB2019/059854
§ 371 (c)(1),
(2) Date: May 12, 2021

(87) PCT Pub. No.: WO2020/100117
PCT Pub. Date: May 22, 2020

(65) Prior Publication Data
US 2021/0396299 A1    Dec. 23, 2021

(30) Foreign Application Priority Data
Nov. 15, 2018    (IN) .............................. 201821042950

(51) Int. Cl.
*F16H 1/28* (2006.01)
*F24S 23/70* (2018.01)
*F24S 30/00* (2018.01)
*F24S 30/45* (2018.01)

(52) U.S. Cl.
CPC ................ *F16H 1/28* (2013.01); *F24S 23/70* (2018.05); *F24S 30/45* (2018.05); *F24S 2030/115* (2018.05); *F24S 2030/134* (2018.05)

(58) Field of Classification Search
CPC ....... H02S 20/32; F24S 50/20; F24S 2030/17; F24S 2030/133; F24S 30/45
USPC ......................................... 126/600–608, 573
See application file for complete search history.

(56) References Cited

U.S. PATENT DOCUMENTS

| 4,383,520 A | 5/1983 | Huebl et al. | |
| 4,574,659 A * | 3/1986 | Arndt | F24S 30/45 475/5 |
| 2014/0174430 A1 * | 6/2014 | Fitzgerald | F24S 30/452 356/138 |
| 2014/0371028 A1 | 12/2014 | Billmeyer | |
| 2015/0316639 A1 | 11/2015 | Russ et al. | |

FOREIGN PATENT DOCUMENTS

| CN | 104964471 A | 10/2015 |
| DE | 102010014788 A1 | 10/2011 |

* cited by examiner

*Primary Examiner* — Vivek K Shirsat
(74) *Attorney, Agent, or Firm* — Pasadena Legal Group; Norman R. Van Treeck

(57) ABSTRACT

Various ways of creating polynomial interpolations in one, two and three dimensions using purely mechanical means are disclosed. Various arrangements of gears are disclosed that can constrain certain rotating elements to rotate equal to the average or difference of the rotation angles of other rotating elements. These arrangements are combined in various ways to create mechanical arrangements having a set of rotating elements that are constrained to be linear or polynomial functions in one or many dimensions. Various uses of mechanical polynomial interpolation are disclosed, including focusing rays of the sun onto a target.

9 Claims, 13 Drawing Sheets

INTERPOLATING GEAR TRAINS AND GEAR NETWORKS

This patent claims priority from provisional patent application 201821042950 titled "INTERPOLATING GEAR TRAIN" filed in Mumbai, India on 15 Nov. 2018

TECHNICAL FIELD

This invention relates to machines. More specifically it relates to sets of gears which actuate an interpolated function.

BACKGROUND ART

Gears which mesh with other gears are well known in the art. Gears are usually used to modify the speed and torque of circular motion transmitted from a drive to a machine that uses that circular motion. A specific type of gear system, known as 'differential gears' is also known in the art. Differential gears are used to drive more than one wheels using a single drive, where the wheels may be naturally connected in a way that makes them turn in a ratio with respect to each other. For example, the two wheels of a vehicle that is turning are turning at different speeds, the ratio of the speeds dependent on the radius of the turn; but both these wheels may be driven by a single drive if a differential gear box is used. A similar mechanical arrangement is used for the reverse application as well: a single machine being driven by two or more drives, as may be used in vehicles with hybrid power sources.

Heliostats are well known in the art. Heliostats are mirrors that individually reflect sunlight onto a target. As the position of the sun changes in the sky, the heliostats change their orientation to keep reflecting sunlight onto the target. Each heliostat is controlled by electronic drives.

SUMMARY OF INVENTION

Various ways of creating polynomial interpolations in one, two and three dimensions using purely mechanical means are disclosed. Various arrangements of gears are disclosed that can constrain certain rotating elements to rotate equal to the average or difference of the rotation angles of other rotating elements. These arrangements are combined in various ways to create mechanical arrangements having a set of rotating elements that are constrained to be linear or polynomial functions in one or many dimensions. Various uses of mechanical polynomial interpolation are disclosed, including focusing rays of the sun onto a target.

The above and other preferred features, including various details of implementation and combination of elements are more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF DRAWINGS

The accompanying drawings, which are included as part of the present specification, illustrate the presently preferred embodiment and together with the general description given above and the detailed description of the preferred embodiment given below serve to explain and teach the principles of the present invention.

DESCRIPTION OF EMBODIMENTS

Various ways of creating polynomial interpolations in one, two and three dimensions using purely mechanical means are disclosed. Various arrangements of gears are disclosed that can constrain certain rotating elements to rotate equal to the average or difference of the rotation angles of other rotating elements. These arrangements are combined in various ways to create mechanical arrangements having a set of rotating elements that are constrained to be linear or polynomial functions in one or many dimensions. Various uses of mechanical polynomial interpolation are disclosed, including focusing rays of the sun onto a target.

Figure 1A:
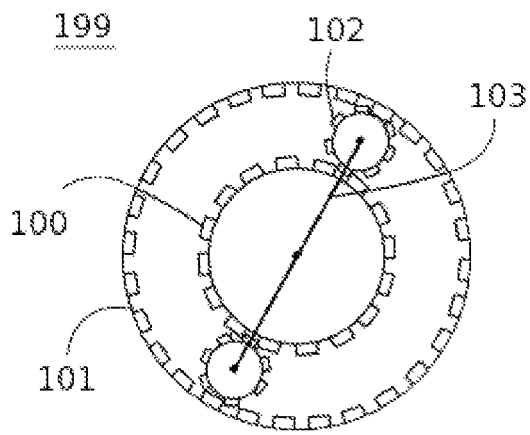
FIG. 1A depicts an arrangement of gears according to an embodiment.

FIG. 1A depicts an arrangement 199 of gears according to an embodiment. Arrangements similar to the arrangement 199 may be variously called "epicyclic gears", "planetary gears", "differential gears" or "integral gears" in the art. A sun gear 100 meshes with planet gears 102 which in turn mesh with a ring gear 101. The planet gears 102 are supported by a carrier frame 103 which is a rigid frame rotating around the same axis as the common axis of sun gear 100 and ring gear 101. The carrier frame 103 is depicted as a rod, but may be any rigid body to which the axes of the planet gears 102 are attached. The arrangement 199 may have less or more than two planet gears 102, for example a single gear, or three or more gears. If a, b and c are the angles through which the sun gear 100, the ring gear 101 and the carrier frame 103 carrying the planet gears 102 have respectively rotated, the arrangement 199 ensures that the angles a, b and c satisfy the following relation:

$$c = \frac{a+b}{2} \quad \text{[Math. 1]}$$

Many different gear or machine arrangements can be imagined giving the above formula, and are within the scope of this invention.

Figure 1B:
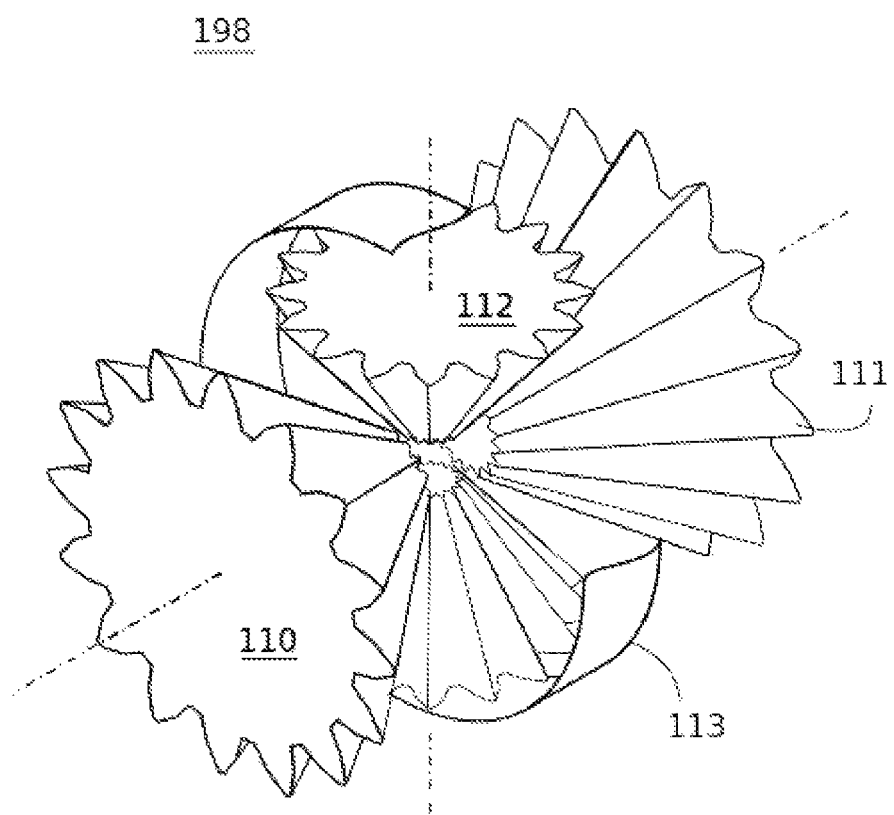
FIG. 1B depicts an arrangement of gears according to an embodiment.

FIG. 1B depicts an arrangement 198 of gears according to an embodiment. Arrangements similar to arrangement 198 of gears may be referred to as "bevel type planetary gears", "bevel type differential gears" or "differential gears" in the art. Planet gears 112 mesh with two bevel gears 110 and 111. The planet gears 112 are supported by a carrier frame 113 which rotates around the same axis that bevel gears 110 and 111 rotate around. If a, b and c are the angles through which the bevel gear 110, bevel gear 111 and carrier frame 113 have respectively rotated, the arrangement 198 ensures that the angles a, b and c satisfy the relation given in [Math. 1].

Figure 1C:
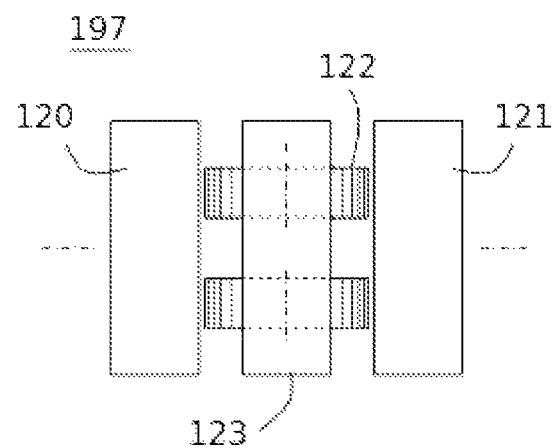
FIG. 1C depicts an arrangement of gears according to an embodiment.

FIG. 1C depicts an arrangement 197 of gears according to an embodiment. Pinion gears 122 mesh with two circular rack gears 120 and 121 where the racks are cut in the sides of circular discs. The pinion gears 122 are supported by carrier frame 123 which rotates around the same axis that circular rack gears 120 and 121 rotate around. If a, b and c are the angles through which the circular rack gear 120, circular rack gear 121 and carrier frame 123 have respectively rotated, the arrangement 197 ensures that the angles a, b and c satisfy the relation given in [Math. 1].

Figure 2:
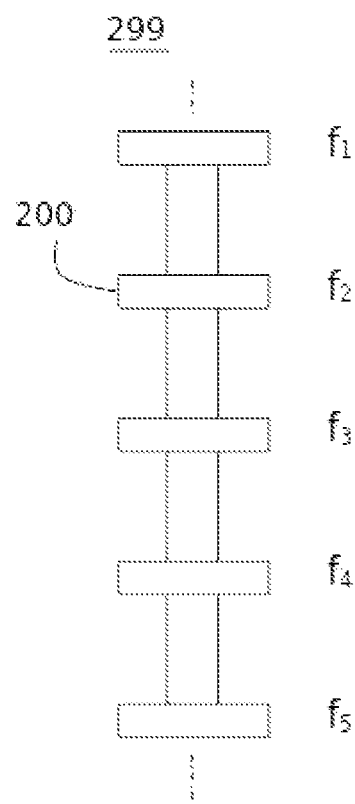
FIG. 2 depicts an arrangement of many gears arranged in a particular fashion.

FIG. 2 depicts an arrangement 299 of many gears arranged in a particular fashion. Let $f_1, f_2, \ldots f_n$ be the angles through which successive gears 200 have turned. The gears are arranged in such a fashion that $$f_2 = \frac{f_1 + f_f}{2} \quad \text{[Math. 2]}$$
$$f_3 = \frac{f_2 + f_4}{2}$$
$$\vdots$$
$$f_{n-1} = \frac{f_{n-2} + f_n}{2}$$

These are n−2 equations in n unknowns. Any of the techniques disclosed in the present disclosure may be used to constraint the gears in the above fashion. From the above equations, we get $$f_2 - f_1 = f_3 - f_2 \quad \text{[Math. 3]}$$
$$f_3 - f_2 = f_4 - f_3$$
$$\vdots$$
$$f_{n-1} - f_{n-2} = f_n - f_{n-1}$$

In other words, all consecutive differences are exactly the same. We may write this is $$f_i - f_{i-1} = p \quad \text{[Math. 4]}$$

This leads to the conclusion that $$f_i = f_1 + p(i-1) \quad \text{[Math. 5]}$$

Here p is the consecutive difference, but from the above, we may also write $$p = \frac{f_n - f_1}{n-1} \quad \text{[Math. 6]}$$

In other words, if $f_1$ and $f_n$ were fixed, this would fix p, and $f_i$ and p thus being fixed, each $f_i$ would be fixed according to [Math 5].

[Math 5] implies that $\{f_i\}_i$ is an arithmetic progression. (The mathematical symbol $\{f_i\}_i$ stands for the sequence $f_i$ as a function of i.) Thus, setting the boundary angles $f_1$ and $f_n$ sets the other angles in such a way that an arithmetic progression is formed. In other words, we get a linear interpolation from $f_1$ to $f_n$ as depicted in FIG. 3.

Note that the $f_i$ variables have a topology of R (real numbers) not of $S_1$ (a circle); e.g. 540 degrees and 180 degrees (1½ turns and ½ turns) are not considered to be the same. The fs remember not only the angle, but also how many turns were taken from the starting condition. The formulas are correct under this interpretation of the variables. Formulas in this disclosure can also be viewed to be correct under the alternative interpretation that the variables only describe angle devoid of number of turns, in which the mathematical operations '+' and '=' are then taken to be modulo 180 degrees. The mathematics of the present invention remains true under either interpretation, and various applications can utilize either of the two interpretations.

Figure 3:
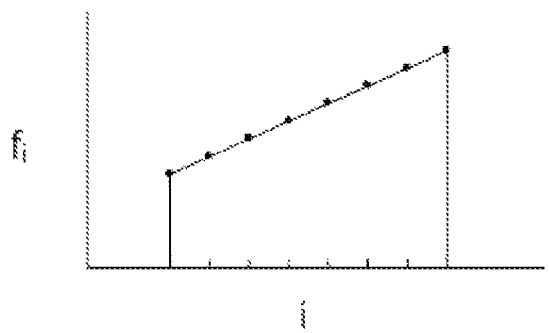
FIG. 3 depicts a linear relation between angle variables according to an embodiment.

FIG. 3 depicts a linear relation between angle variables according to an embodiment. The angle variables $f_i$ are depicted as a function of i. The $f_i$s stand for the angles by which gears from consecutive units in a gear train have turned by. As described by [Math 5] the $f_i$s form an arithmetic progression, i.e. are linearly dependent on i.

Mechanical Arrangement

Figure 4A:
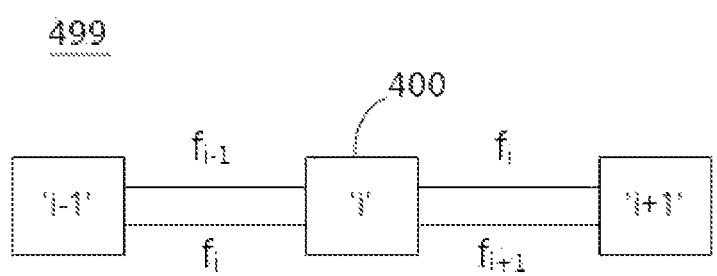
FIG. 4A depicts a mechanical arrangement of gear boxes in a schematic fashion.

FIG. 4A depicts a mechanical arrangement 499 of gear boxes in a schematic fashion. Every planetary gearbox (say gearbox i depicted by box 400) requires access to mechanical variables $f_{i-1}, f_i, f_{i+1}$. In an embodiment the mechanical variables $f_{i-1}, f_i, f_{i+1}$ are connected to the gearbox as an axle or any turning rigid body. In another embodiment, the mechanical variables may be connected using belts, or racks or rods that are pushed rather than turned.

Figure 4B:
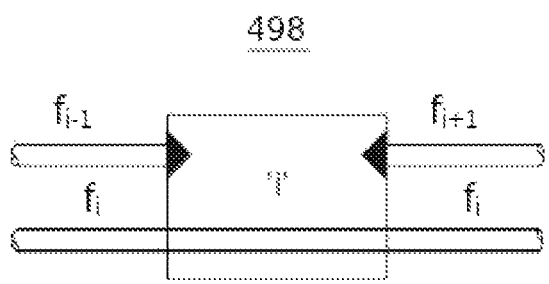
FIG. 4B depicts gearbox i in schematic fashion.

FIG. 4B depicts gearbox i 498 in schematic fashion. Gearbox i 498 is mechanically constrained to follow the following law $$f_i = \frac{f_{i-1} + f_{i+1}}{2} \quad \text{[Math. 7]}$$

using the various embodiments of the present invention. This is symbolically depicted by the presence of shaded triangles next to the axles $f_{i-1}$ and $f_{i+1}$. There is no shading on $f_i$ which is the angle that is the average of the two other angles. Furthermore, the axle corresponding to $f_i$ is depicted as passing through the gearbox, in other words, is depicted as its output being available on more than one ports, preferably at opposite sides of the gearbox.

Figure 4C:
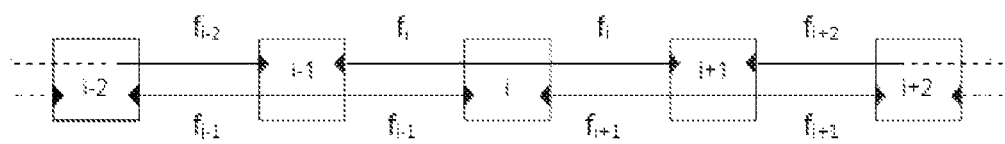
FIG. 4C depicts an interpolating gear train according to an embodiment.

FIG. 4C depicts an interpolating gear train 497 according to an embodiment. This figure uses the schematic notation of FIG. 4B, i.e. the axle passing through the gearbox is constrained to be turned by an amount equal to the average of the two turns of the axles having shaded triangles. The gear train 497 creates an arithmetic progression $\{f_i\}_i$ of angles.

Figure 4D:
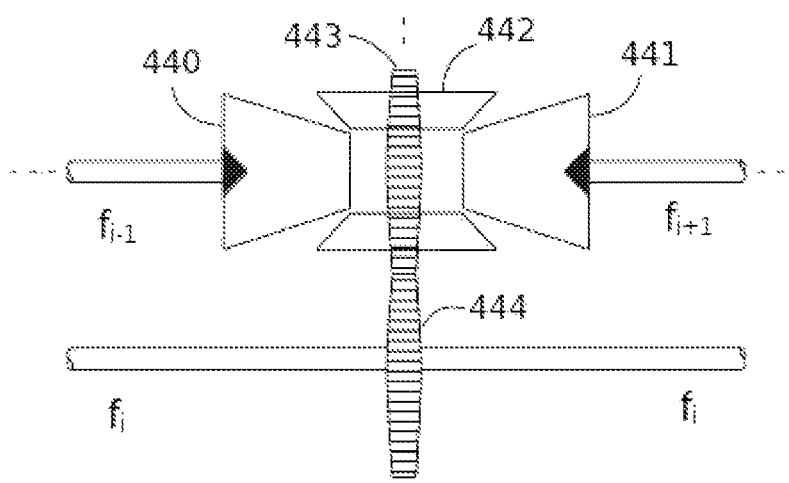
FIG. 4D depicts a gearbox according to an embodiment.

FIG. 4D depicts a gearbox 496 according to an embodiment. The gearbox 496 has the mechanical constraints required by the schematic gearbox 498 of FIG. 4B many instances of which are used in the gear train 497 of FIG. 4C. The bevel gears 440 and 441, the planet gears 442 and the carrier frame 443 are as described in conjunction with FIG. 1B. The planet gears 442 are connected to the carrier frame 443 which is a rotating ring. On the outer surface of this carrier frame 443 rotating ring, gear teeth are provided, which rotate another gear 444. The gear 444 is mechanically constrained by this arrangement to turn an amount which is the average of the amounts that the bevel gears 440 and 441 turn by. There are many other mechanical embodiments with the same mathematical effect.

Figure 4E:
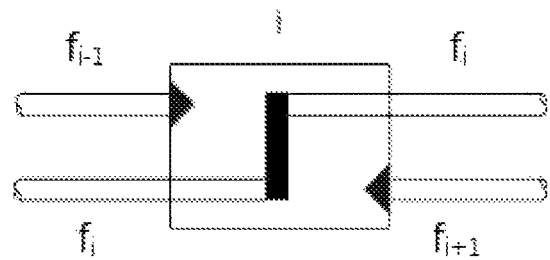
FIG. 4E depicts gearbox i in schematic fashion.

FIG. 4E depicts gearbox i 495 in schematic fashion. Gearbox i 496 is mechanically constrained to follow the law given in [Math 7] using the embodiments of the present invention. The convention of drawing the schematic figure is, the unshaded variable $f_i$ is mechanically constrained to have a rotation equal to the average of the shaded variables $f_{i-1}$ and $f_{+1}$. The mechanical arrangement is such that the shaded variables $f_{i-1}$ and $f_{i+1}$ are offset with respect to each other, and are mechanically opposite to two mechanical ports each carrying a copy of the unshaded variable $f_i$.

Figure 4F:
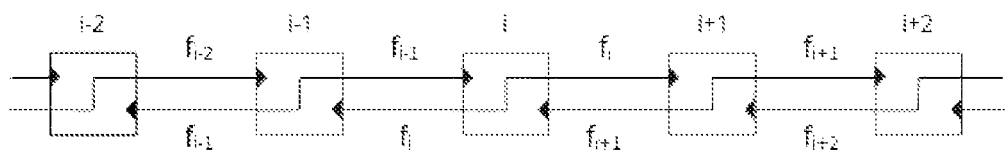
FIG. 4F depicts an interpolating gear train according to an embodiment.

FIG. 4F depicts an interpolating gear train 494 according to an embodiment. This figure uses the schematic notation of FIG. 4E, i.e. the unshaded axles are constrained to turn by an amount equal to the average of the two turns of the axles having shaded triangles. The gear train 494 creates an arithmetic progression $\{f_i\}_i$ of angles.

Figure 5A:
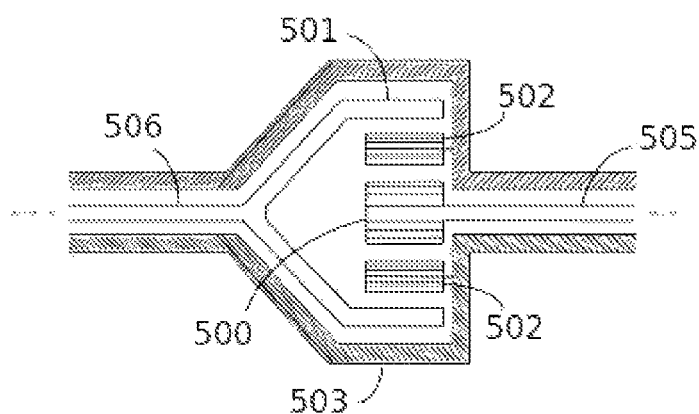
FIG. 5A depicts a gearbox with concentric axles according to an embodiment.

FIG. 5A depicts a gearbox 599 with concentric axles according to an embodiment. Planet gears 502 are fixed to a planet axle 503 (shaded) which is concentrically outside of axle 505 of sun gear 500 and axle 506 of ring gear 501. The planet gears 502 mesh with the sun gear 500 and ring gear 501 (even though such meshing is not depicted in the diagram for ease of understanding the diagram).

Figure 5B:
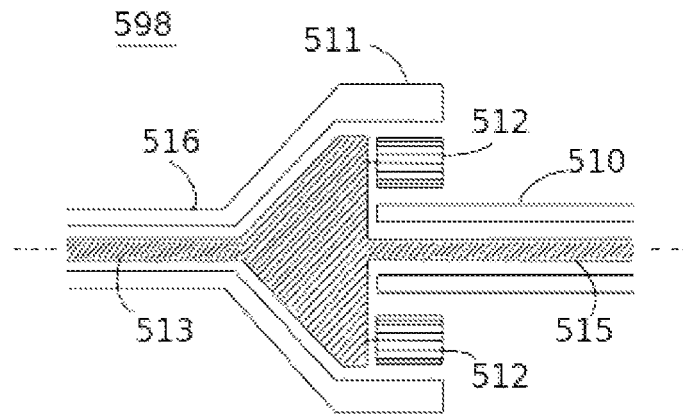
FIG. 5B depicts a gearbox with concentric axles according to an embodiment.

FIG. 5B depicts a gearbox 598 with concentric axles according to an embodiment. Planet gears 512 are fixed to a planet axel 513 (shaded) which is concentrically inside of axle 515 of sun gear 510 and axle 516 of ring gear 511. The planet gears 512 mesh with the sun gear 510 and ring gear 511. The gearbox 599 of FIG. 5A and the gearbox 598 of FIG. 5B are complementary. In an embodiment, they are alternated with each other on a single straight axis, with the concentric axes rigidly connected to each other.

Figure 5C:
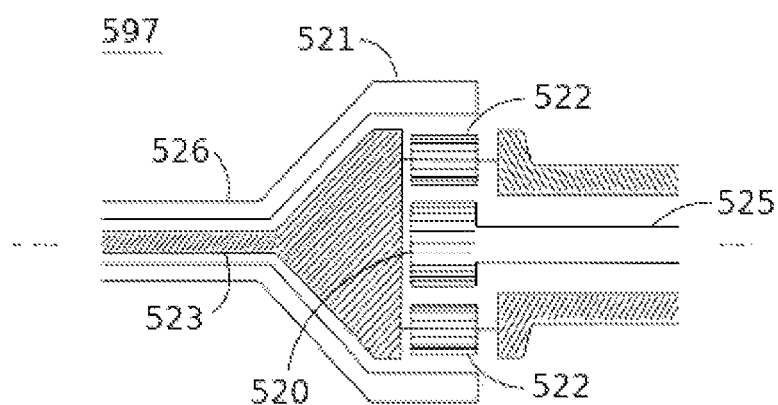
FIG. 5C depicts a gearbox according to an embodiment.

FIG. 5C depicts a gearbox 597 according to an embodiment. The planet gears 522 are fixed to the planet axle 523 (shaded) which is concentrically inside of the axle 526 of ring gear 521 and concentrically outside of the axle 525 of sun gear 520. The planet gears 522 mesh with the sun gear 520 and ring gear 521. The gearbox 597 fits into itself to create an interpolating gear train. In an embodiment, an interpolating gear train comprises many gearboxes 598 placed one after the other on a single axis, with the respective concentric axes rigidly connected.

Figure 6:
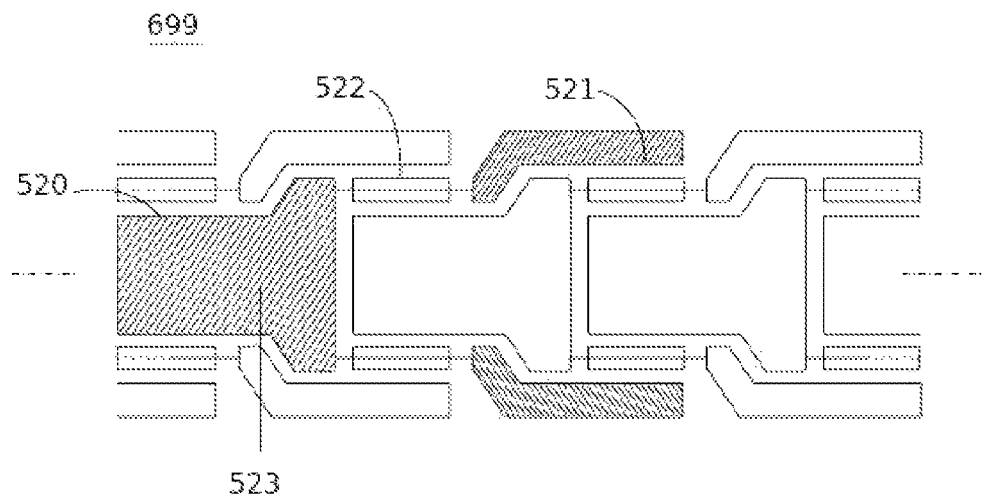
FIG. 6 depicts an interpolating gear train according to an embodiment.

FIG. 6 depicts an interpolating gear train 699 according to an embodiment. The shaded axle 523 is a single axle. The axle 523 has planet gears 522 attached to it. The axle 523 also has a sun gear 520 provided on one end of the axle and a ring gear 521 provided on the other end. Many such axles are situated adjacent to each other on a single axis in such a way that the planet gears of one axel mesh with the ring gear of the axel on one side and with the sun gear of the axel on the other side.

Figure 7:
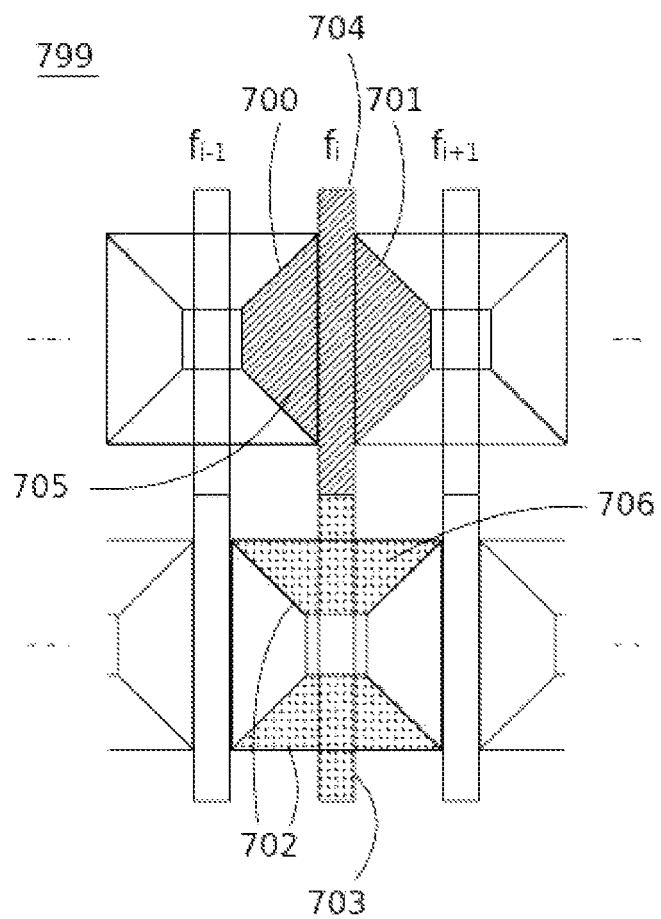
FIG. 7 depicts an interpolating gear train using beveled gears in a tight configuration, according to an embodiment.

FIG. 7 depicts an interpolating gear train 799 using beveled gears in a tight configuration, according to an embodiment. The part 705 shaded by hatching is a single rigid solid piece, having two beveled gears 700 and 701 and a gear 704. The part 706 shaded with a dotted pattern is a piece having three parts—one gear 703 and two beveled planetary gears 702. The part 705 and part 706 together form a single gearbox in the gear train. Such gearboxes are placed consecutively in alternating orientations. In other words the solid part 705 will mesh with adjacent planetary gears whereas the planetary gears 702 will mesh with adjacent solid parts.

The top gear faces provide the fs that are an arithmetic progression (i.e. create a linear interpolation). This gear train is easy to manufacture, easy to assemble, compact and robust.

Figure 8:
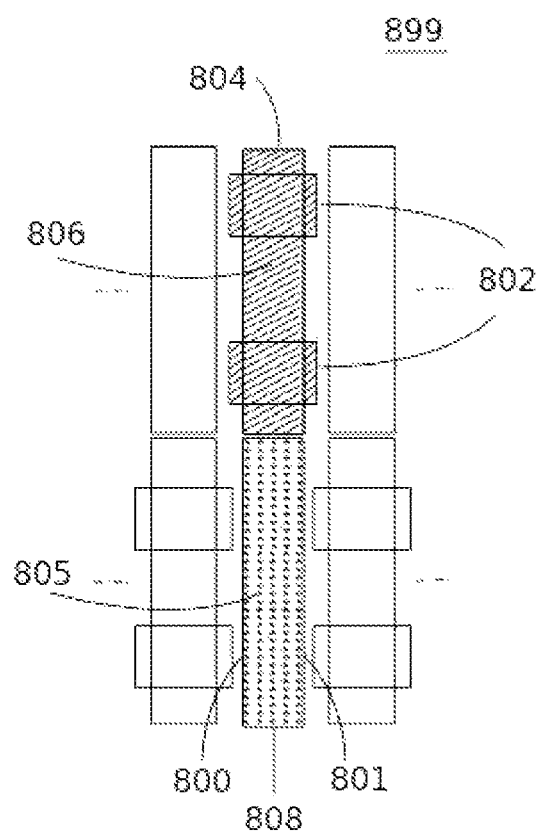
FIG. 8 depicts an interpolating gear train using non-beveled gears in a tight configuration, according to an embodiment.

FIG. 8 depicts an interpolating gear train using non-beveled gears in a tight configuration, according to an embodiment. The part 805 shaded with a dotted pattern is a single rigid solid piece. Part 805 is a cylindrical disc having a gear 808 on its curved face and serrations on its two circular faces creating a circular racks 800 and 801. The circular racks 800 and 801 engage the small planetary gears on either side. The part 806 shaded with a diagonal pattern is a piece having three parts—one disc gear 804 and two small disc-shaped planetary gears 802. The planetary gears 802 mesh with and churn between the circular racks on the sides of the adjoining discs. The part 805 and part 806 together form a gearbox in the gear train. Such gearboxes are placed adjacent to each other in alternating orientations.

The top gear faces provide the fs that are an arithmetic progression (i.e. create a linear interpolation). This gear train is easy to manufacture, easy to assemble, compact and robust.

Some applications are load bearing whereas others are only signal bearing. For such signal bearing applications, the force endured by the gears etc may not be a concern. In such cases we could make these gear trains from cheap plastic and mold them rather than machine them. To get accuracy, we can gear down the signal at the output of the gear train which is the input to the application. In other words, many many turns of the gears creating the signal outputs $\{f_i\}_i$ cause a very tiny change of the output.

Figure 9:
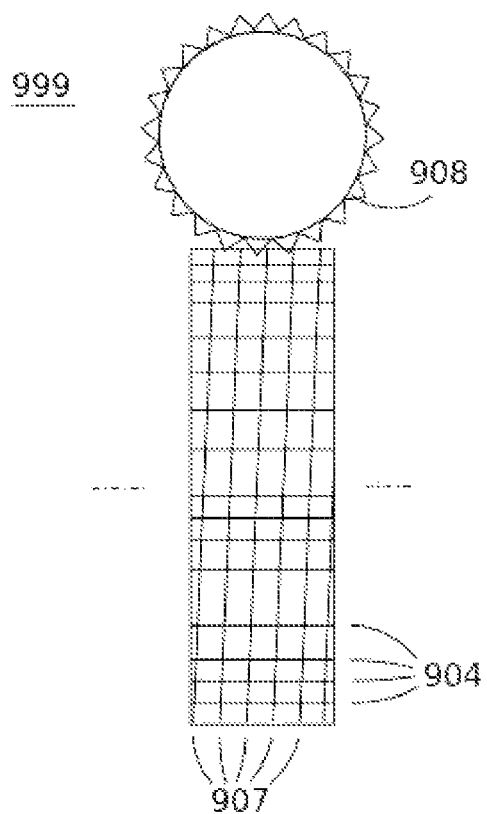
FIG. 9 depicts an output gear.

FIG. 9 depicts an output gear 999. Gear 999 is to be used as the output gear of the gear train such as the gear train 899 of FIG. 8, according to an embodiment. The gear has a toothed gear pattern 904 and a worm pattern 907 both cut into it. The lower gears mesh into the toothed pattern 904, whereas an application gear 908 meshes into the worm pattern 907. The worm-type engagement causes the application 908 to turn slowly compared to the output gear 999, thus increasing precision of controlling the application.

Interpolating Gears of Higher Orders

According to an embodiment, interpolations of not just linear but higher orders is achieved. In principle, interpolation of arbitrary order may be achieved.

Figure 10:
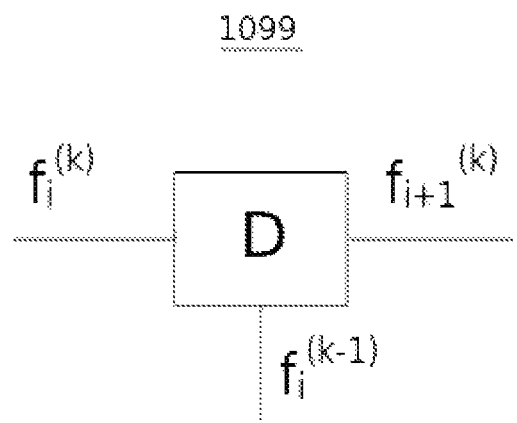
FIG. 10 depicts a differential gearbox in schematic form, according to an embodiment.

FIG. 10 depicts a differential gearbox 1099 in schematic form, according to an embodiment. The differential gearbox denoted D connects three rotations $f_i^{(k)}$, $f_{i+1}^{(k)}$, $f_i^{(k-1)}$ by creating a fixed relation between them. In an embodiment, the relation between the three rotations (possibly presented to the gearbox as three axles, or any means disclosed in this disclosure) is $$cf_i^{(k-1)} = f_{i+1}^{k} - f_i^{k}$$ [Math.8]

In a particular embodiment, the constant c=2, but other constants may also easily be created by using gear ratios appropriately.

Figure 11:
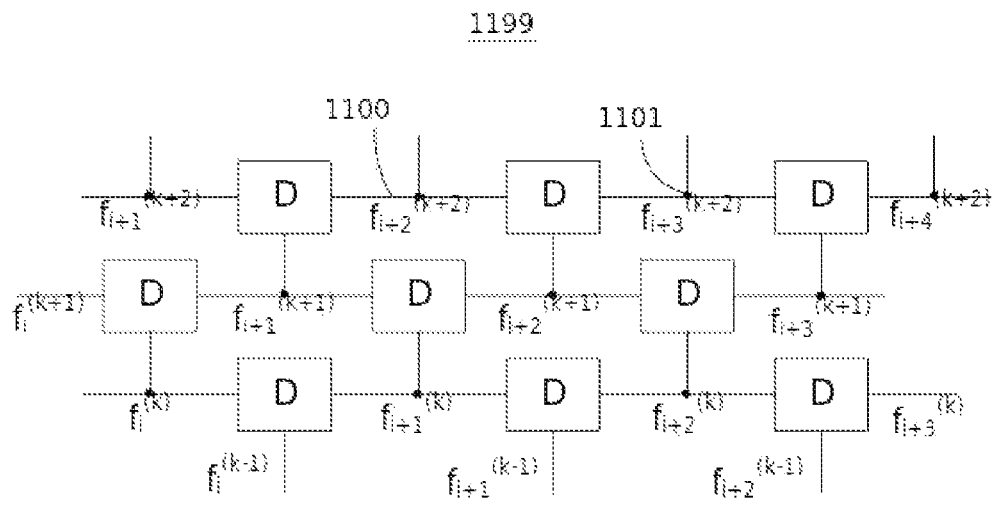
FIG. 11 depicts a network of differential gearboxes in schematic form, according to an embodiment.

FIG. 11 depicts a network 1199 of differential gearboxes in schematic form, according to an embodiment. Each gearbox denoted D is a box like the differential gearbox 1099 as described in FIG. 10. The lines 1100 between the gearboxes imply the same rotation being provided to more than one gearboxes. A "circuit connector dot" like dot 1101 is shown to depict more than two gearboxes receiving the same rotation.

In an embodiment, one low-k row is further constrained in one of the following ways. Either the row k=−1 is constrained such that $$f_i^{(-1)} = 0$$ [Math.9]

or the row k=0 is constrained such that $$f_i^{(0)} = a$$ [Math.10]

for some single settable rotation a, or the row k=1 is constrained such that $$f_i^{(1)} = bi + d$$ [Math.11]

for a pair of settable constants b and d. (By settable, we mean that these are degrees of freedom, not that these will be provided to the mechanical circuit as external inputs.) For example [Math 9] can be achieved by fixing each $f_i^{(-1)}$, or [Math 10] can be achieved by tying all $f_i^{(0)}$ by a link/rod/shaft, or [Math 11] can be achieved by using a linearly interpolating gear train as described in this patent. In an embodiment, a k higher that 1 may be set directly; the general rule being to constrain just one k, and to constrain it to interpolate with a polynomial of order k. In an embodiment, the k that is thus constrained is the lowest k in the gear network 1199.

If $\{f_i^{(k-1)}\}_i$ is a polynomial of order k−1 evaluated at the various integers i, then $\{f_i^{(k)}\}_i$ is a polynomial of order k evaluated at the various integers i. Furthermore, if any polynomial of order k−1 can be created on the $\{f_i^{(k-1)}\}_i$ then any polynomial of order k can be created on the $\{f_i^{(k)}\}_i$. These facts can be proved from equation [Math 8]. From the above facts, using mathematical induction, we can prove the following fact:

Let k'<k be two integers. If $\{f_i^{(k')}\}_i$ is constrained to be a polynomial of order k' evaluated at the various integers i, then $\{f_i^{(k)}\}_i$ is constrained to be a polynomial of order k evaluated at the various integers i. If any polynomial of order k' can be created on $\{f_i^{(k')}\}_i$ then any polynomial of order k can be created on $\{f_i^{(k)}\}_i$.

Thus, if we can constrain a low-k row to be a polynomial of order k, each higher-k row gets automatically constrained to form a higher order polynomial, and there are no further constraints on the polynomials that can be created.

Figure 12:
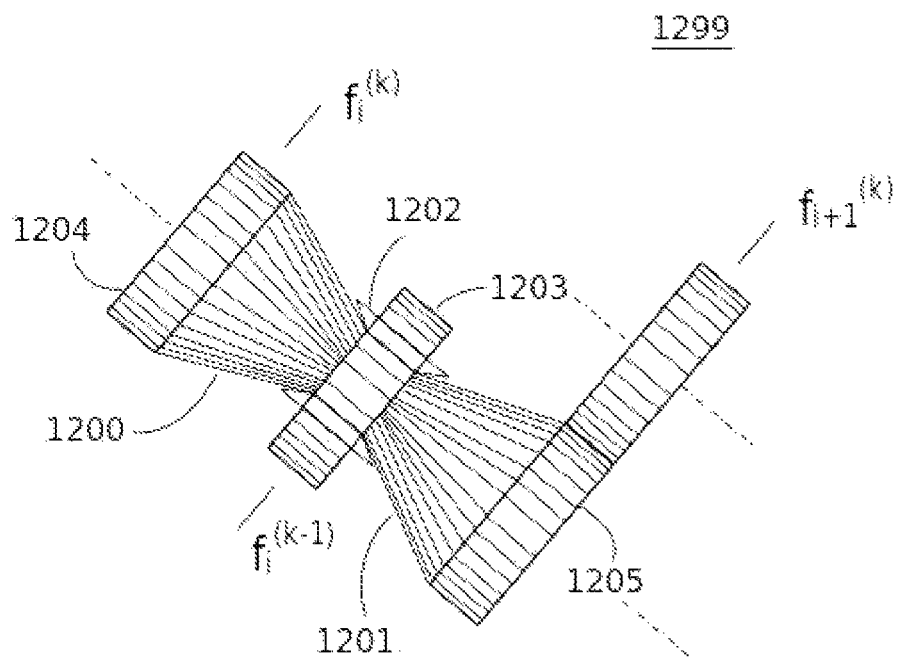
FIG. 12 depicts a mechanical apparatus that performs as a differential gearbox according to an embodiment.

FIG. 12 depicts a mechanical apparatus 1299 that performs as a differential gearbox according to an embodiment. The mechanical apparatus 1299 may be used as the differential gearbox D of FIG. 10, to be used in the gear network 1199 of FIG. 11. The mechanical apparatus 1299 satisfies equation [Math 8] with c=2. Planet gears 1202 move between beveled gears 1200 and 1201 (or alternatively churn between circularly racked parallel wheels). The beveled gears 1200 and 1201 have disc gears 1204 and 1205 attached rigidly to them. The axes of planet gears 1202 are attached to a carrier frame 1203 having a gear arranged on its outer surface. The carrier frame 1203 acts as $f_i^{(k-1)}$ and the disc gears 1204 and 1205 act as $f_i^{(k)}$ and $-f_{i+1}^{(k)}$ respectively. A gear meshing with gear 1205 produces the output $f_{i+1}^{(k)}$.

Figure 13A:
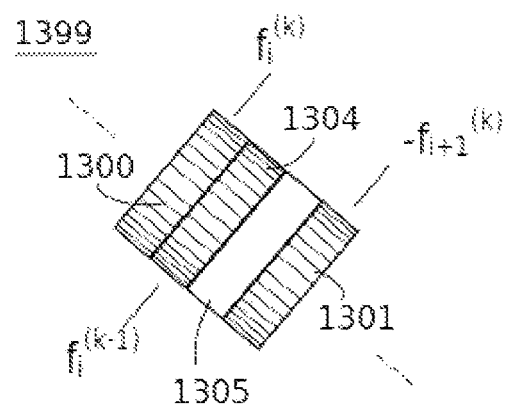
FIG. 13A depicts a gearbox as viewed from outside, according to an embodiment.

FIG. 13A depicts a gearbox 1399 as viewed from outside, according to an embodiment. The carrier frame 1304 having a gear (pinion or planet gear—internal, not shown) is placed between gears 1300 and 1301. The carrier frame 1304 also has an external gear on it (shown). The gear on the carrier frame 1304 is not placed centrally between gears 1300 and 1301 but shifted to one side. In an embodiment, there is a gap 1305 between the gear on the carrier frame 1304, and one of the gears 1301. The gap 1305 may be equal in width to the gears 1301 and 1300 as well as the gear on the carrier frame 1304. If a, b and c are respectively the angles by which the gear 1300, gear 1301 and carrier frame 1304 turn, this gearbox implements the constraint [Math 1]. It may do this by internally implementing a mechanism like the arrangements 199, 198 or 197 of FIG. 1A, 1B or 1C respectively. The gear on the carrier frame 1304 is constrained to turn by an angle equal to the average of the angles that gears 1300 and 1301 turn by.

The gear on the carrier frame 1304 is the $f_i^{(k-1)}$ input, whereas the gear 1300 is the $f_i^{(k)}$ input. The gear 1301 is $-f_{i+1}^{(k)}$. The negative sign will be corrected by a gear that meshes with gear 1301 and corrects the sign thus creating $f_{i+1}^{(k)}$ (not depicted). As will be seen in FIG. 13B, a gear of a meshing gearbox itself performs that function.

Figure 13B:
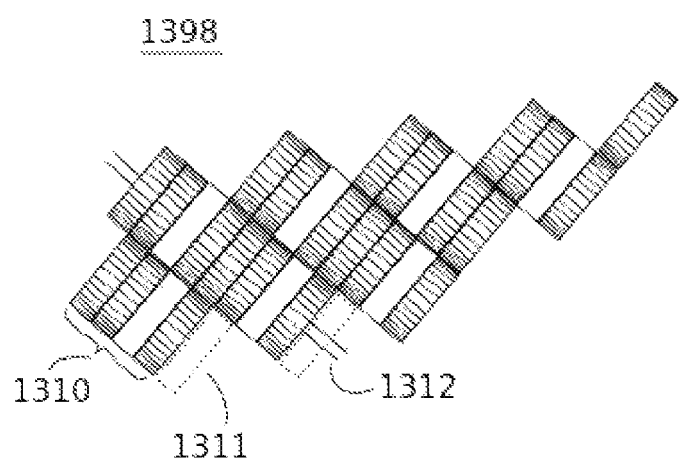
FIG. 13B depicts a mechanical arrangement made out of gearboxes according to an embodiment.

FIG. 13B depicts a mechanical arrangement 1398 made out of the gearboxes of FIG. 13A according to an embodiment. In an embodiment, the gearboxes such as gearbox 1310 in one horizontal row are of one k. The row is horizontal, but the gearboxes are oriented slant. The gearboxes mesh in a way that the network of FIG. 11 is created. Single gears such as gear 1311 are used in terminal locations. (In an embodiment, we may use the entire differential unit as well, but everything in it but one gear will not be utilized.)

Various gearboxes such as gearbox 1310 are placed on an axle 1312. A single axle can take multiple differential gear units. Units on a single axle are have the same value of the number i+k. It is possible to lock the terminal gear onto this axle (or mold it into the axle) so that these terminal gears can be controlled by turning the axle. In this way, both the low-k condition as well as the polynomial control can be set. The other gears are not locked into the axle, but rotate freely on it.

Figure 14A:
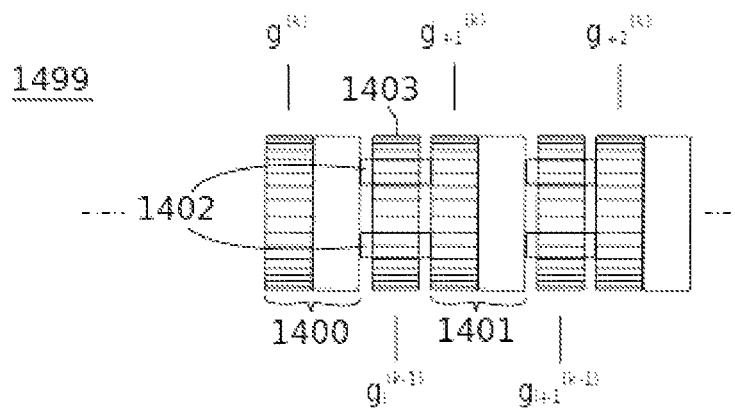
FIG. 14A depicts one row of an interpolating gear network according to an embodiment.

FIG. 14A depicts one row 1499 of an interpolating gear network according to an embodiment. This embodiment is another way in which the equation [Math 8] may be implemented. Consider the transformation $$g_i^{(k)} = (-1)^i f_i^{(k)}$$ [Math.12]

Substituting [Math 12] in [Math 8] gives $$c(-1)^i g_i^{(k-1)} = (-1)^{i+1} g_{i+1}^{(k)} - (-1)^i g_i^{(k)}.$$ [Math.13]

which simplifies to $$cg_i^{(k-1)} = -g_{i+1}^{(k)} - g_i^{(k)}$$ [Math.14]

We may now implement equation [Math 14] mechanically, and only recover the final fs using inverting gears as required to implement [Math 12]. We may also choose every alternate output from the gs, which match the fs. Equation [Math 14] can be implemented mechanically: one way to implement it is to implement the averaging scheme of equation [Math. 1] which will correspond to c=−2.

In an embodiment, the equation [Math 14] is implemented as shown in FIG. 14A. Some discs 1403 with gears have small planet discs 1402 embedded in them, which churn between circular racks on the adjoining discs 1400 and 1401. Discs with planet gears alternate with discs with circular racks. We may easily merge such rows together as shown in FIG. 14B.

Figure 14B:
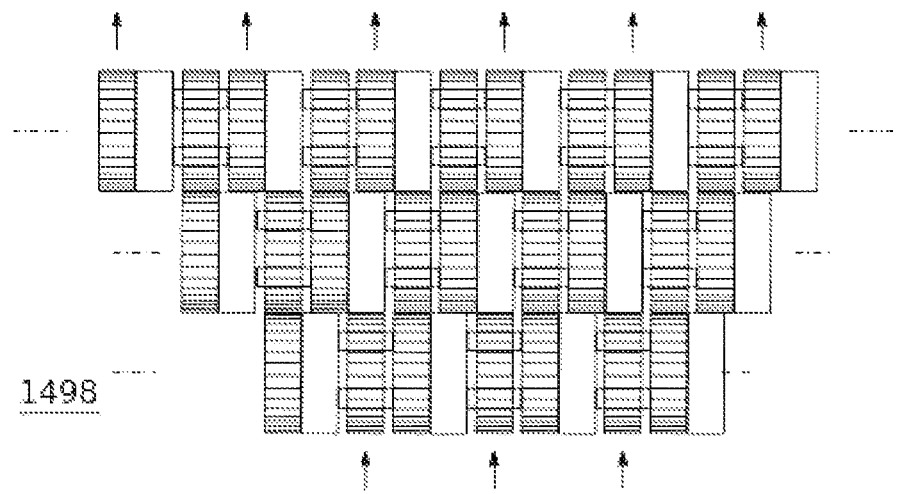
FIG. 14B depicts a compact interpolating gear network according to an embodiment.

FIG. 14B depicts a compact interpolating gear network 1498 according to an embodiment. Rows such as the row 1499 of FIG. 14A mesh with each other in such a way as to implement [Math 14]. At the input, the condition $g_i^{(-1)}=0$ can be provided by locking the corresponding input gears. The other input conditions corresponding to [Math 10] or [Math 11] may also be provided. The output will be in the form of g so if f is needed for the application, we will have to invert every alternate output. This can be done by extra gearing, or by meshing output racks alternately to the opposite sides of the output gears (which act as pinions for extracting the interpolated signal).

Further Augmentation

We can create a 2D array of such interpolating gears. In one embodiment, the 2D array is a bilinear interpolation. In another embodiment, the 2D array is a 2D linear interpolation. Bilinear interpolation is achieved by making interpolating linearly both horizontally and vertically. In an embodiment, one of the two interpolations only happens at the edges. In another embodiment, the interpolation happens at all gear boxes. The bilinear interpolation may also be used as a linear interpolation by using a special control strategy or a mechanism. Higher polynomial order interpolation 2D gear arrays may be created as well. For example, quadratic or bi-quadratic interpolation; cubic or bi-cubic interpolation and so forth. Similarly, 3D arrays of interpolating gears may also be made. The entire 1D, 2D or 3D array may be bathed in a bath of oil or lubricant for smooth operation.

Figure 15:
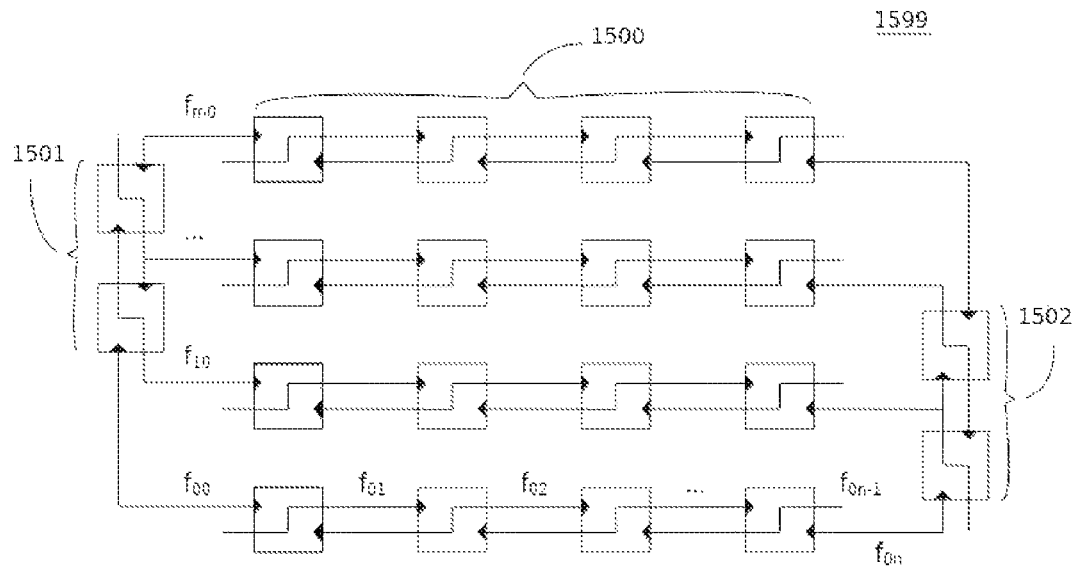
FIG. 15 depicts a 2D array bi-linear interpolation gear network as a schematic.

FIG. 15 depicts a 2D array bi-linear interpolation gear network 1599 as a schematic. Each gearbox performs the function described for gearbox 495 of FIG. 4E. Interpolating gear trains 1500 are fed constraints from interpolating gear trains 1501 and 1502 which are to the two sides and arranged in a perpendicular direction to interpolating gear trains 1500. The interpolating gear train 1501 creates the constraints $f_{i\,0}=ai+b$. The interpolating gear train 1502 creates the constraints $f_{in}=ci+d$, where n−1 is the number of gearboxes in each interpolating gear train 1500 giving number of variables n. Interpolating between these two, the interpolating gear trains 1500 create the interpolation $f_{ij}=f_{i\,0}+(j/n)f_{in}=b+ai+[(d-b)/n]j+[(c-a)/n]ij$. This is seen to be general bilinear interpolation. This can be further constrained to be a general linear interpolation by constraining c=a. There are many ways of achieving this, and one way will be by ensuring that $f_{m\,0}-f_{00}=f_{mn}-f_{0\,n}$. This is a mechanical constraint that can be set by taking the difference using two differentials and equating them using a linking rod. c=a may also be ensured by a control strategy rather than a mechanical constraint.

In an embodiment, rather than gear trains 1501 and 1502 being parallel to each other, are placed in such a way that one of their ends is the same set of variables. This may be used to control a triangular rather than a rectangular patch, but the rows of the triangle may be extended to a rectangle or any suitable shape. (Similarly the rows 1500 of the rectangle of the present embodiment may also be extended to extrapolate beyond the extents of their interpolation.) This will ensure linear rather than bilinear interpolation.

Similarly, other strategies can be implemented. For example, to create bi-quadratic interpolation, the gear trains 1501 and 1502, and another gear train placed parallel to them are all quadratic interpolation gear trains (according to other embodiments of this invention), and the gear trains 1500 are also quadratic interpolation gear trains. A biquadratic gear network may be used for quadratic interpolation by adding constraints mechanically or as a control strategy. To create quadratic-linear interpolation, the gear trains 1501 and 1502 are quadratic interpolation gear trains and the gear trains 1500 are linear interpolation gear trains.

Actuation

The 1D, 2D or 3D arrays of interpolating gears disclosed in this invention have a few degrees of freedom left in them. These degrees of freedom are exactly the number of degrees of freedom of the polynomial basis implemented. E.g. a 1D linear interpolation will have 2 degrees of freedom, a 1D quadratic interpolation will have 3, and so forth. These degrees of freedom are controlled by one or more actuators attached to some of the variables that the gear networks contrain. An actuator may be a manual actuator such as a handle, or it may be an electronically controlled actuator such as a motor, a servo motor, a stepper motor, etc. The motors may be attached to any of the gears being controlled, depending on how the array is to be controlled. E.g., if they are all attached to the top polynomial, the gear train will interpolate between their settings. In an embodiment, the motors are attached to the top polynomial gears, and are as equally spaced as possible. In another embodiment, motors are provided for ease of access rather than for direct interpolation and the settings of the motors so as to achieve the required polynomial is calculated using linear algebra.

Output

The output rotation of the gear train may be used directly by the application. Alternatively, the output rotation may be converted to a linear motion. This could be done using a rack (with the gears themselves acting as pinions, or by using extra pinions), or belts and pulleys, or a crank shaft arrangement. Using paths set for these linear motion elements, various non-linear functions on top of the linearly interpolated polynomial may be achieved. For some applications, this will give functions close to the required functions with a polynomial of smaller degree. Non-linear functions may also be implemented by designing appropriate linkages.

In an embodiment, more than one independent interpolating gear trains/networks are used. For example, two gear trains/networks may be used to provide two outputs at all locations (the locations that the two gear trains/networks produce the output at are point-wise close to each other). These may be used to implement an interpolated vector function.

Applications

In an embodiment interpolating gears are used to control heliostat arrays which are both large scale and small scale. In an embodiment, flexing membranes, such as the membranes of speakers are controlled using interpolating gears. Such gears can be used in animatronics. Such gears can be used for artificial spines. Such gears can be used to control robots and robotic actuators, including for robotic surgery. Snake-like behavior can be simulated using interpolating gears. We can make complex airplane control surfaces. The interpolating gears may control individual elements of a complex surface, or the surface may be a single unbroken elastic surface (such as a metallic surface) which flexes using the input of the gear train. The present invention may be used for focusing mirrors or lenses e.g. for astronomy, cameras, etc. Many small radar antennae can be focused or defocused and directions moved using interpolating gears.

Heliostats

Heliostat arrays are (usually 2D) arrays of mirrors which change their orientation to focus the rays of the sun onto a fixed target. In other applications, the sun may be replaced by another light source, or source of another kind of waves, and the target may be moving instead of fixed. Each mirror in the heliostat array may be flat, or it may be made into a spherical, paraboloid, cylindrical or other shape to further focus the rays as they fall onto the target.

Traditionally, each heliostat is separately controlled mechanically or electronically. In an embodiment of the present invention, a large array of heliostat mirrors is controlled together by an interpolating gear train or gear network and only as many drives as are the degrees of freedom in the gear train or gear network.

Each mirror has two degrees of angular freedom. (Mechanically there are three degrees of angular freedom to a rigid body, but rotating a mirror around an axis perpendicular to its surface going through its center will achieve close to no effect, so one degree of freedom is left out.) Each of these degrees of angular freedom is controlled by a separate interpolating gear train or network. More specifically, each of the degrees of angular freedom of a specific mirror is controlled by a particular output gear in an interpolating gear train or network. Various arrangements of how this is achieved are possible. A simple arrangement is the heliostat mirror is hinged on a ball joint. (One degree of freedom may be restricted, or the mirror may have a symmetry in one degree of freedom, so it can be kept unrestricted and will not matter.) Two vertical rods rise from the two interpolating gear trains, and meet the bottom of the mirror. As the two vertical rods move, various orientations are created.

A more complex arrangement couples the rotary impetuses directly to the two mirrors. Two rotary impetuses may be converted into two axis rotations using a mechanical arrangement. For example, a planet gear may be used. The planet gear can change both its position and its angle (based on the behavior of the sun and ring gears). Thus, this can be used to achieve position of an axis (around another axis) and turn around that axis.

Various non-linear functions may be used before the mirror actuation to get better focus over time of the day and day of the year. In an embodiment, the entire heliostat assembly is protected by a glass cover or a glass case; this prevents dust from entering the mechanical system or clouding the mirrors. In an embodiment, individual mirrors may be adjusted for perfect focus during an installation or servicing. This may be done by having extra adjustment screws or inputs. The adjustment has to be done over various possible focusing positions. This may be done practically by testing. Since the sun moves extremely slowly and will create multiple positions quite slowly, another technique such as an LED, a LASER etc may be used, and a sensor/camera at the target may be used to detect focus. This could be done at night, or during the day. If during the day, a wavelength may be used where the sun is not bright.

In an embodiment, the control of the heliostat array is entirely mathematical, based on the known position of the sun. In another embodiment, a sensor detects the focus and continuously adjusts either the control itself or the control parameters (biases) to achieve better focus. The sensor detecting the focus may be an imaging or non-imaging light sensor. Alternatively, the performance of the application itself (e.g. energy production) may be used as an indication of how good the focus is.

Applications of heliostats include using sunlight as a heat source (which may be used directly, or may be converted to electricity) or as a light source (light which may be transported for further applications, or may be converted directly to electricity using technologies such as photovoltaic technologies).

Figure 16:
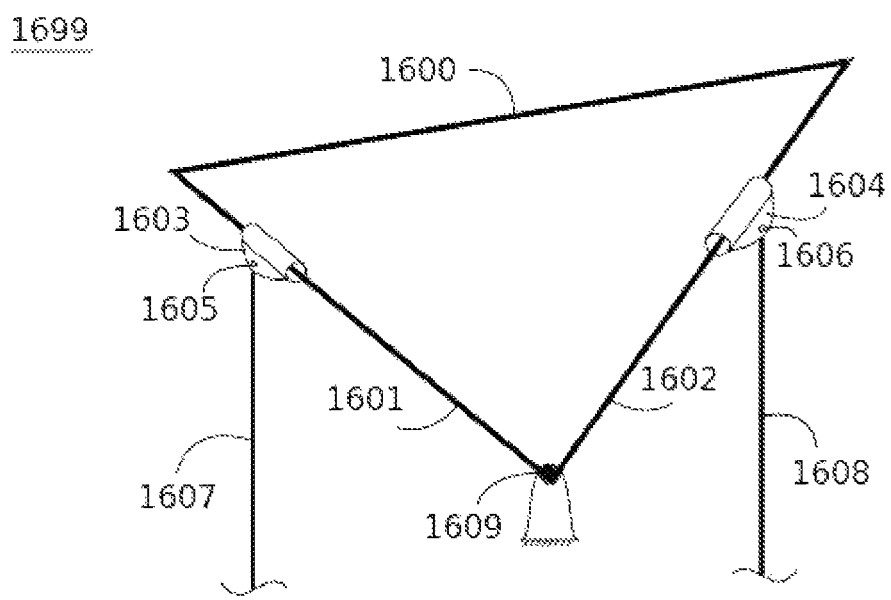
FIG. 16 depicts an element control mechanism according to an embodiment.

FIG. 16 depicts an element control mechanism 1699 according to an embodiment. The element being controlled may be a heliostat, or a speaker surface, or an aerodynamic element, etc. A rigid frame 1600 has two arms 1601 and 1602. In an embodiment, the arms 1601 and 1602 are straight. Linear slides 1603 and 1604 can slide on the two arms respectively. The linear slides 1603 and 1604 are connected through pivots 1605 and 1606 to linear control elements 1607 and 1608. Linear control elements 1607 and 1608 are controlled by two interpolating gear networks, i.e. they are the linear outputs of two interpolating gear networks at a particular place. The rigid frame 1600 is attached to a fixed frame using a ball joint 1609, or a spherical rolling joint, or gimbals. The element to be controlled (such as heliostat mirror, not pictured) is mounted on the rigid frame 1600. When the interpolated functions change, the linear control elements 1607 and 1608 move, which cause the rigid frame 1600 to change its orientation, thus changing the orientation of the element to be controlled. The arms 1601 and 1602 may be curved rather than being straight, to facilitate the actuation of various transfer functions between the interpolated functions and the actual orientation created.

I claim:

1. A mechanical system of creating a polynomial function comprising a plurality of gearboxes arranged in multiple rows that are arranged sequentially, each gearbox comprising a first gear (110, 120, 440, 520, 700, 800, 1200), a second gear (111, 121, 441, 521, 701, 801, 1201) and a third gear (112, 122, 442, 522, 702, 802, 1202), wherein the third gear (112, 122, 442, 522, 702, 802, 1202) is supported by a carrier frame (103, 113, 123, 443, 1203), wherein the third gear (112, 122, 442, 522, 702, 802, 1202) is arranged to be meshing with the first gear (110, 120, 440, 520, 700, 800, 1200) and the second gear (111, 121, 441, 521, 701, 801, 1201), wherein the first gear (110, 120, 440, 520, 700, 800, 1200), the second gear (111, 121, 441, 521, 701, 801, 1201) and the carrier frame (103, 113, 123, 443, 1203) are arranged to be rotating around a first axis in such a way that the rotating angle of the carrier frame (103, 113, 123, 443, 1203) is average of rotating angle of the first gear (110, 120, 440, 520, 700, 800, 1200) and rotating angle of the second gear (111, 121, 441, 521, 701, 801, 1201), wherein the second gear (111, 121, 441, 521, 701, 801, 1201) in each of the plurality of gearboxes excluding the last gearbox in each of the row is connected to the first gear (110, 120, 440, 520, 700, 800, 1200) of the succeeding gearbox in the same row and the carrier frame (103, 113, 123, 443, 1203) of a gearbox in a succeeding row in such a way that the rotations of the first gears (110, 120, 440, 520, 700, 800, 1200) of the plurality of gearboxes in each of the row create a polynomial function.

2. The mechanical system of claim 1, wherein the polynomial function is a linear function.

3. The mechanical system of claim 1, wherein the polynomial function is a function of quadratic or higher order.

4. The mechanical system of claim 1, further comprising electronic drives connected to the first gears (110, 120, 440, 520, 700, 800, 1200) of some of the plurality of gearboxes in the row at one end of the sequence of rows, the number of electronic drives being one more than the degree of the polynomial interpolated by the row.

5. The mechanical system of claim 1, further comprising mirrors attached to the first gears (110, 120, 440, 520, 700, 800, 1200) of the plurality of gearboxes in the row at one end of the sequence of rows.

6. The mechanical system of claim 1, wherein the third gear (112, 122, 442, 522, 702, 802, 1202) in each of the plurality of gearboxes is a planetary gear.

7. The mechanical system of claim 6, wherein the planetary gear in each of the plurality of gearboxes is a beveled gears.

8. A method of concentrating sunlight comprising, providing mirrors that can change orientation, providing a target on which to concentrate sunlight, providing a network of gears that is constrained to form a polynomial function of rotation variables, connecting the mirrors to the network of gears, and actuating the network of gears in such a manner that the mirrors change orientation so that each mirror reflects sunlight onto the target, wherein the step of providing the network of gears that is constrained to form a polynomial function of rotation variables comprises providing a plurality of gearboxes arranged in multiple rows that are arranged sequentially, wherein each of the plurality of gearboxes comprising a first gear (110, 120, 440, 520, 700, 800, 1200), a second gear (111, 121, 441, 521, 701, 801, 1201) and a third gear (112, 122, 442, 522, 702, 802, 1202), wherein the third gear (112, 122, 442, 522, 702, 802, 1202) is supported by a carrier frame (103, 113, 123, 443, 1203), wherein the third gear (112, 122, 442, 522, 702, 802, 1202) meshes with the first gear (110, 120, 440, 520, 700, 800, 1200), and the second gear (111, 121, 441, 521, 701, 801, 1201), wherein the first gear (110, 120, 440, 520, 700, 800, 1200) the second gear (111, 121, 441, 521, 701, 801, 1201) and the carrier frame (103, 113, 123, 443, 1203) are arranged to rotate around a first axis, wherein the second gear (111, 121, 441, 521, 701, 801, 1201) in each of the plurality of gearboxes excluding the last gearbox in each row is connected to the first gear (110, 120, 440, 520, 700, 800, 1200) of the succeeding gearbox in the same row and the carrier frame (103, 113, 123, 443, 1203) of a gearbox in a succeeding row in such a way that the rotations of the first gears (110, 120, 440, 520, 700, 800, 1200) of the gearboxes in each row create a polynomial function.

9. The mechanical system of claim 1, wherein the plurality of gearboxes are connected to one or more actuators to control the plurality of gearboxes.

* * * * *